July 22, 1958 W. R. DRESSER 2,844,070
AUTOMATIC APPARATUS FOR CONTROLLING SYNCHRONIZATION
OF DIFFERENT FILM FEEDING MECHANISMS
Filed Oct. 25, 1954 5 Sheets-Sheet 4

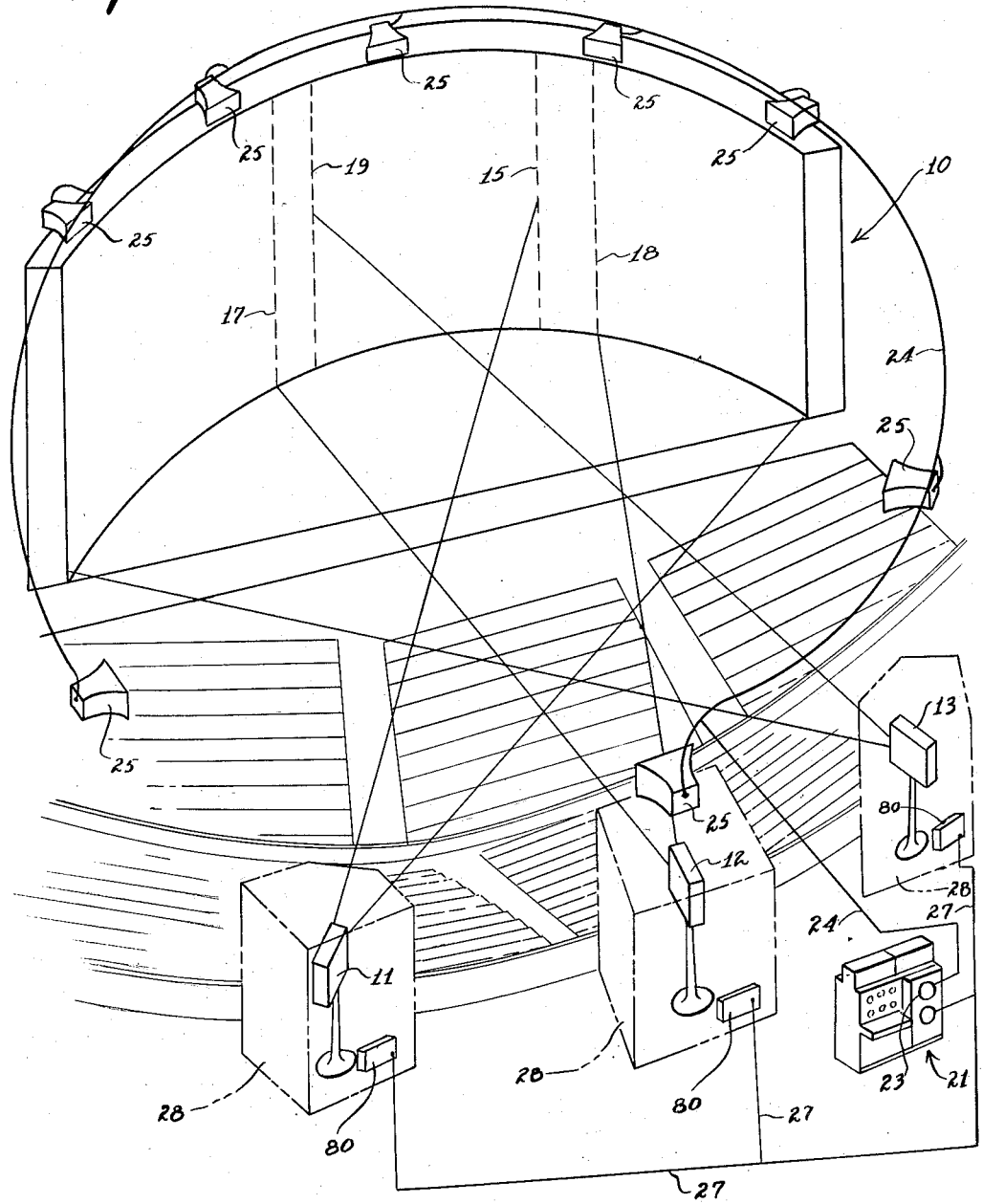

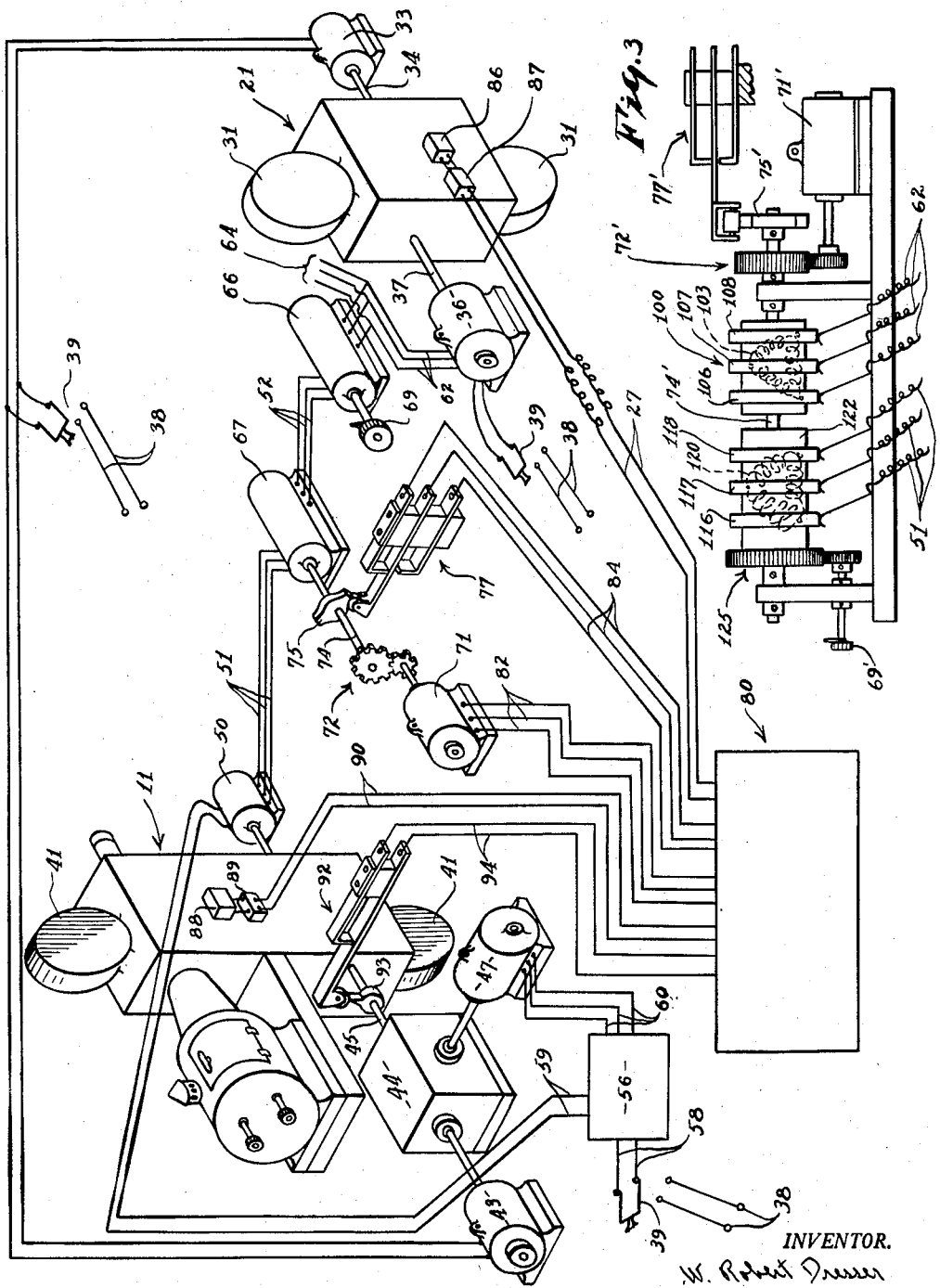

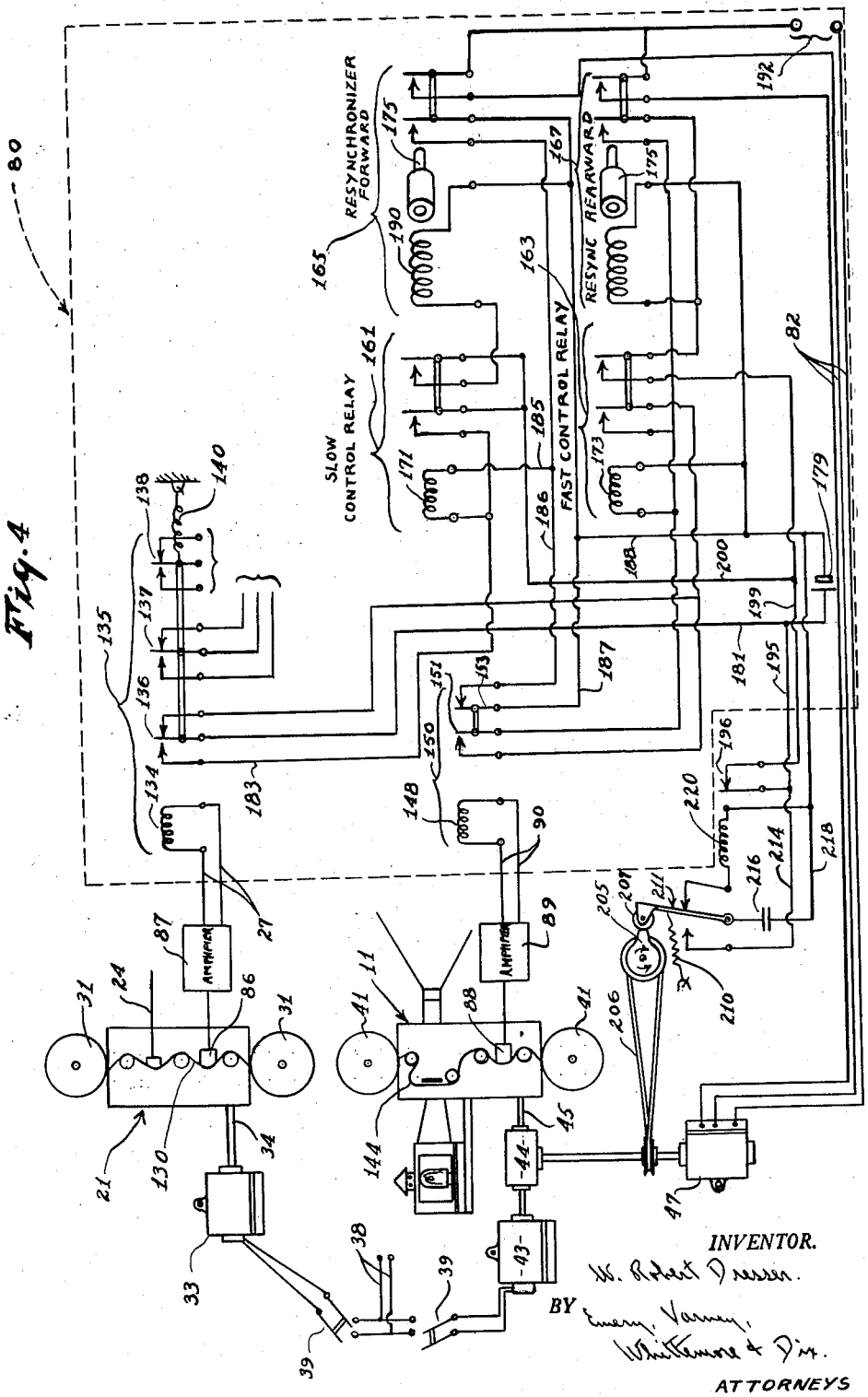

INVENTOR.
W. Robert Dresser
BY
ATTORNEYS

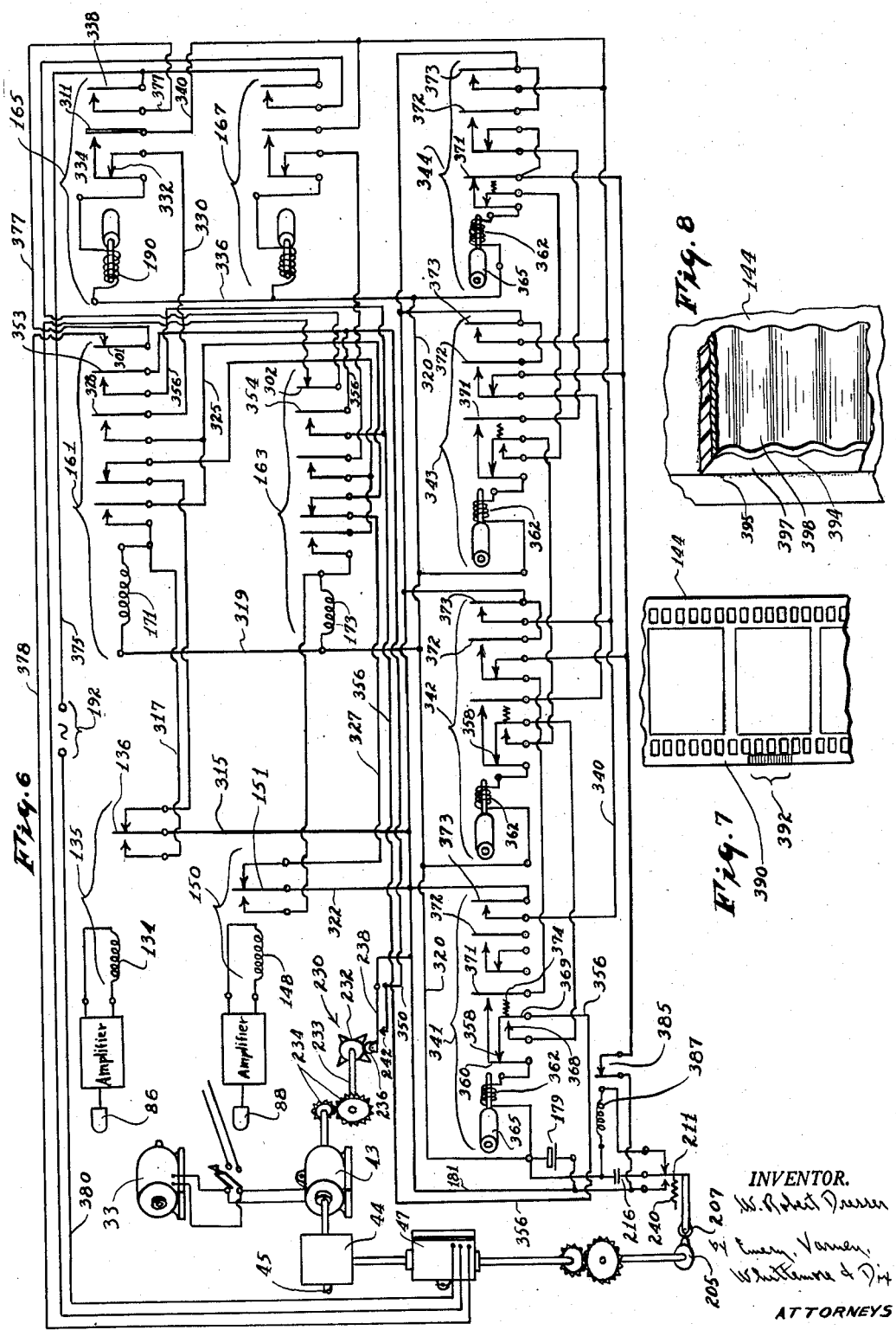

United States Patent Office 2,844,070
Patented July 22, 1958

1

2,844,070

AUTOMATIC APPARATUS FOR CONTROLLING SYNCHRONIZATION OF DIFFERENT FILM FEEDING MECHANISMS

Willis Robert Dresser, Long Hill, Conn., assignor to The Vitarama Corporation, Huntington, N. Y., a corporation of New York Application October 25, 1954, Serial No. 464,325

19 Claims. (Cl. 88—16.2)

This invention relates to apparatus for establishing synchronization of films in different film-operating units; for example, the sound film in a sound reproducer and the motion picture film in a projector which operates in unison with the sound reproducer. The invention is intended more especially for synchronizing the operation of a plurality of motion picture projectors, such as are used for projecting mosaic pictures, with the film having the sound tracks used to supply the sound, and especially stereophonic sound, that accompanies the mosaic picture.

It is an object of the invention to provide improved means for synchronizing the operation of two films which are advanced by different motor driven units, and to reestablish synchronization if it is lost because of variations in the speeds at which the motors of the different units run, or because of editing errors in the film, or from other causes. Where there is a sound track on one film and only pictures on the other film, the film having the sound track is used as the master and the picture film is synchronized with it because the picture film moves intermittently and can be retarded or advanced without interfering with the projection; but the sound film moves continuously and cannot be either speeded up or slowed down without producing objectionable results in the reproduced sound. Where the sound tracks are on the picture films, then one of the picture films is used as a master control and the other films are synchronized with it. The invention can also be made with a special film for timing and synchronizing, the film serving no other purpose, the term "film" is used herein in a generic sense to include belts and tapes with or without perforations.

Another object of the invention is to provide automatic control mechanism for establishing synchronization of films operated by different units and for reestablishing the synchronization if it is lost. One feature of the invention relates to control of the synchronization by signals on the films, and to measurement of the extent to which the films are out of synchronization as part of the automatic control.

In one embodiment of the invention, signals on the films indicate whether the films are out of synchronization, and if they are, a correction of one frame is made by either advancing or retarding the picture film, as necessary. At the next synchronization signal the control apparatus re-appraises the relation of the films, and if they are still out of synchronism makes a further correction of one frame. This simple method of control will be described first in connection with the basic control circuits of the invention, but it has the disadvantage of taking longer to synchronize or to resynchronize than other embodiment of the invention which measure the amount by which the films are out of synchronization and then correct at one time for the total synchronization error.

In the preferred embodiments of the invention, the control apparatus first appraises that there is an error, and then accumulates information about the extent of the error, and then corrects the error. It may be said, therefore, that it is another object of the invention to provide control mechanism for determining the extent to which two films are out of synchronization and for then correcting the error automatically.

There is another important advantage in having the apparatus determine the extent of the synchronization error, because the synchronization signals on the films cannot be placed any closer than the maximum error which the apparatus will correct. Since threading errors may amount to a large number of picture frames, and bad editing errors may also amount to a number of picture frames, the synchronization signals on the films must be at least as far apart as the maximum errors which will be encountered from these causes. If the control mechanism corrects for only one frame with each synchronization signal, it will be evident that considerable time may pass before a large threading or editing error is corrected. When the control mechanism determines the extent of the error and corrects it all at one time, then the films are promptly brought into synchronism.

Other features of the invention relate to the control means for determining whether the lack of synchronization results from the picture film being ahead of or behind the sound film; and to different ways for counting the number of picture frames in a synchronization error. One modification of the invention employs mechanical counting means, and another employs electrical counting means.

Other objects, features and advantages of the invention will appear or be appointed out as the description proceeds.

In the drawings, forming a part hereof, in which like reference characters indicate corresponding parts in all the views;

Figure 1 is a diagrammatic view showing a theatre in which a mosaic picture is projected on a screen by three projectors, and stereophonic sound is supplied by speakers located at different regions of the screen and at different locations within the theatre;

Figure 2 is a diagrammatic, perspective view showing the relation of a sound reproducer to a single motion picture projector and the connections to the auxiliary control equipment for synchronizing or re-synchronizing the operation of the projector with that of the sound reproducer;

Figure 3 is a diagrammatic view of a portion of the control apparatus for synchronizing the shutter operation with the film movement;

Figure 4 is a wiring diagram showing in modification of the invention in which synchronization errors are corrected one frame at a time following each synchronization signal on the film;

Figure 5 shows a modified form of the invention in which the control apparatus determines the extent of the synchronization error by mechanically counting the number of frames by which the picture film is out of synchronization with the sound film;

Figure 6 is a wiring diagram showing a modification of the invention similar in principle to that of Figure 5 but using electrical means for counting the number of frames in the synchronization error;

Figure 7 is an enlarged view showing the motion picture film and the way in which synchronization signals are located along one edge of the film, and Figure 8 is a greatly enlarged fragmentary view of a portion of a film and illustrating another way in which synchronization signals can be applied to the film.

In Figure 1 a theatre is shown with a screen 10 on which a mosaic picture is projected by a plurality of separate motion picture projectors 11, 12 and 13. The image projected by the projector 11 covers the screen from a line 15 to the right hand edge of the screen. The middle projector 12 throws an image on the screen extending from a line 17 to a line 18; and the third projector 13 covers the remaining portion of the screen from the left hand edge over to a line 19.

The images on the screen overlap between the lines 15 and 18, and between the lines 17 and 19. The purpose of this overlap is to avoid the necessity of having critical match lines where the different images come together. The overlapping zone of each image is vignetted and in the opposite direction from the overlapping zone of the adjacent image so that the total illumination intensity between the lines 15 and 18, and between the lines 17 and 19, on the screen is substantially equal to that of the other areas of the screen.

The sound which accompanies the mosaic picture on the screen 10, and which is coordinated with the action shown in the pictures, comes from a sound reproducer 21 which preferably uses a film strip having a plurality of parallel sound tracks. The projectors, 11, 12 and 13 use a motion picture film, and the expression "film strip," as used herein, designates a flexible strip having either photographic characters thereon or other characters such as magnetized metal particles that may be used for sound recording and reproduction. The sound signals from the sound reproducer 21 are controlled in suitable circuits from control apparatus 23 that supplies signals through a multi-conductor cable 24 to different speakers 25 located at various places with respect to the screen for stereophonic sound effects, which form no part of the present invention.

The operation of the projectors 11, 12 and 13 is synchronized by synchronizing each projector with the sound reproducer 21 which serves as a master control in the illustrated embodiment of the invention. There are synchronization signals on the sound film which operate impulse devices in the sound reproducer to supply signals through conductors 27 to synchronizing control mechanism which will be described in connection with the other views.

Each of the projectors is located in a separate projection booth 28, to have the projectors widely spaced in order to obtain light beams substantially normal to the center of the screen area which the respective projectors illuminate.

Figure 2 shows diagrammatically the connection of the sound reproducer 21 with the projector 11, and it will be understood that the connection of the sound reproducer 21 to the other projectors 12 and 13 is similar.

The sound reproducer 21 has film strip reels located in housings 31, and has film-moving mechanism of any conventional design driven by a motor 33 through a power shaft 34. A synchro generator 36 is connected with the film-moving mechanism of the sound reproducer by a shaft 37, and is thus driven indirectly from the motor 33.

The synchro generator 36 may be connected to operate at the same speed as the motor 33 or it may be driven through reduction gearing in order to obtain a wider range of correction for the apparatus. Both the motor 33 and the synchro generator 36 are supplied with alternating current from power line connections 38 and through switches 39.

The projector 11 has film-reels housings 41 and has film-moving mechanism, of any desired design, driven from a motor 43 through differential gearing 44 and a power shaft 45. A servomotor 47 is connected to the differential 44 in position to rotate the ring gear of the differential, or the structure that is the equivalent of the ring gear, so as to add or subtract revolutions or fractions of a revolution, to the motion imparted to the shaft 45 by the motor 43. The differential gearing 44 is "irreversible"; that is, it can be rotated by the power applied by the motor 43 but it cannot be rotated by power applied to the shaft 45 from the projector end of the shaft. This effect is most easily obtained by having a lower gear, such as worm gearing with the pitch of the worm too slow to permit the worm to be rotated by power applied to the worm wheel. Such irreversible gearing is well known.

The projector 11 has a synchro-control transformer 50 connected to it and driven from the film-moving mechanism of the projector. Thus the synchro-control transformer 50 operates at a speed which is coordinated with the speed of the film moving mechanism of the projector. It is preferably driven at a speed slower than that of the driving motor 43.

The synchro-control transformer 50 is connected with its servomotor 47 through a circuit which includes a servo amplifier 56. This servo amplifier 56 is connected with a power supply by conductors 58; and it is connected with the synchro-control transformer 50 by conductors 59. The connections between the servo amplifier 56 and the servomotor 47 are designated by the reference character 60. The servo amplifier is direction and phase-sensed, and since the construction of such amplifiers is well understood in the art, an explanation of its internal construction is not necessary for a complete understanding of this invention.

The synchro-generator 36 has a three wire connection 62 for supplying error signals to the synchro-control transformer 50. There is a branch line 64 leading from the synchro-generator 36 to the synchro-control transformers of the other projectors and which correspond to the transformer 50 of Figure 2. It will be understood that the other projectors have connections and auxiliary equipment identical with that shown for the projector 11 in Figure 2. Two synchro-differentials 66 and 67 are placed in series between the synchro-generator 36 and the synchro-control transformer 50 by means of the conductors 51 and 52. The synchro-differential 66 has a knob 69 by which it can be adjusted manually.

The purpose of the manually adjustable synchro-differential is to bring the operation of the shutter of the projector 11 into the desired relation with those of the other projectors. It may be desirable to have all of the projector shutters operate in synchronism or it may be desirable to have the open period of one projector begin slightly ahead of the projector that produces the adjacent image on the screen if there is monitoring equipment for automatic control of the light intensity of the different images of the match zones; but such equipment forms no part of the present invention.

The synchro-differential 67 is operated automatically from a servomotor 71 through gearing 72. The synchro-differential 67 has a shaft 74 through which rotation is imparted to it from the gearing 72; and there is a re-synchronizing cam 75 secured to the shaft 74. This re-synchronizing cam 75 operates a switch 77.

The operation of the servomotor 71 is controlled from an automatic controller 80. This controller 80, which will be explained more fully in connection with other figures of the drawing, contains apparatus for determining when the films are out of synchronization, which film is ahead of the other, and for restoring the synchronization. In some modifications of the invention, the controller 80 also contains an automatic frame error computer for determining the number of frames by which the films are out of synchronism.

The servomotor 71 is connected with the controller 80 by conductors 82. The switch 77 is connected with the controller 80 by conductors 84.

Synchronization signals on the sound record film operate a signal impulse device 86 on the sound reproducer 21, and the signals from this impulse device 86 are amplified by the associated amplifiers 87 and are transmitted to the controller 80 through conductors 27. There is a similar impulse device 88 on the projector 11 for operation by the synchronization signals on the motion picture film, and an associated amplifier 89. This amplifier 89 is connected with the controller 80 by conductors 90.

For those modifications of the invention in which the controller 80 counts the number of frames by which the films are out of synchronization, there is a counting switch 92 operated by a cam 93 on the shaft 45 of the motion picture projector 11. This counting switch 92 is connected with the controller by conductors 94.

Much of the control mechanism described in Figure 2 is similar to that disclosed in my co-pending application Serial Number 321,329, filed November 19, 1952; now Patent No. 2,711,668, issued June 28, 1955. In that application, however, the re-synchronization is effected by manual adjustment of a synchro-differential, such as the synchro-differential 66, and there is no automatic control mechanism for effecting synchronization, nor is there any means for counting the number of frames by which the films are out of synchronization.

The operation of the apparatus shown in Figure 2 will be described briefly before explaining the details of the controller 80.

When the sound reproducer 21 and motion picture projector 11 are operating, they drive the synchro-generator 36 and the synchro-transformer 50, respectively, and as long as these devices run at the same speed, no error signal is transmitted through the conductor 59 to the servo-amplifier 56 and no power is supplied to the servo-motor 47. If the synchro-generator 36 runs ahead or behind the synchro-transformer 50, then an error signal is supplied through the conductor 59 to the servo-amplifier 56 and power is supplied to the servo-motor 47 to cause the motor to turn in one direction or the other, as necessary, to either add or subtract revolutions, or fractions of a revolution, to the rotation of the shaft 45 so as to bring the projector 11 back into synchronism with the sound reproducer 21. This control merely insures that the films in the sound reproducer and the motion picture projector run at the same speed.

However, there may be threading errors or editing errors in the films so that even though they do run at the same speed and are kept running at the same speed, the sound may not be synchronized with the picture frames. In order to overcome this difficulty, there are synchronization signals on both the sound film and the motion picture film. The nature of these signals will be described more fully in connection with some of the other views of the drawing, but for the present it is sufficient to understand that the synchronization signals on the sound film operate the impulse device 86 to send a signal to the controller 80 each time that one of the synchronization signals on the sound film passes the impulse device 86. Similarly, the synchronization signals on the motion picture film operate the impulse device 88 to send signals to the controller 80 whenever a synchronization signal on the moving picture film passes the impulse device 88.

These impulses produced by corresponding synchronization signals on the different films should be received at the same time by the controller 80. If the impulse comes from the sound reproducer 21 before the corresponding impulse is received from the motion picture projector 11, then the controller 80 determines that the picture film is running behind the sound film. On the other hand, if the impulse comes from the projector first, then the controller 80 determines that the picture film is running ahead of the sound film.

Depending upon whether the picture film is ahead of or behind the sound film, the controller 80 supplies power to turn the servomotor 71 in one direction or the other and to turn the synchro-differential 67 so as to provide for the speeding up or slowing down of the motion picture projector and to bring it into synchronism with the sound film.

If the controller 80 is one that determines the extent of the synchronization error, then the number of impulses from the switch 92 which reach the controller 80 between the time that the synchronization signals are received from the sound reproducer 21 and the projector 11, are counted. The cam 93 is constructed so as to give the switch 92 as many operations as there are picture frames passing the gate in the projector 11. There are, thus, as many impulses from the switch 92 during this error determining period as there are picture frames in the synchronization error.

Figure 3 shows a resolver 100 which can be used in place of the two synchro-differentials 66 and 67. The resolver 100 has a shaft which corresponds to the shaft 74' of Figure 2 and this shaft is indicated by the reference character 74. Other parts in Figure 3 which corresponds to similar parts in Figure 2 are indicated by the same reference characters with a prime appended.

There is a three phase winding 103 on the shaft 74' and the junctures of the different legs of the windings 103 are connected with slip rings 106, 107 and 108. These slip rings contact with brushes at the end of conductors 62 which lead to the synchro-generator 36 (Figure 2). Other conductors 51 from the synchro-transformer lead to brushes that contact with slip rings 116, 117 and 118 (Figure 3). These slip rings 116, 117 and 118 connect with the juncture points between windings of a three phase winding 120 carried by a shell 122 which surrounds the shaft 74' at a substantial radial distance from the shaft 74'.

Although the windings 103 and 120 are shown separated longitudinally in Figure 3, for clearer illustration, in the actual construction of the resolver 100, the three phase winding 103 is located inside of the three phase winding 120 which is carried by the shell 122. The winding 103, which is attached to the shaft 74' is moved angularly about the axis of the shaft by operation of the servomotor 71' in either direction. The stator winding 120, carried by the shell 122 can be adjusted angularly by means of the knob 69' which turns the shell 122 by means of gearing 125.

Figure 4 shows a wiring diagram for the controller 80, of Figure 2, and shows the other units of Figure 2 but with some simplification for clearer illustration. The synchro-differentials 66 and 67 are omitted in Figure 4, and so is the servomotor 71. Figure 4 shows the servomotor 47 controlled directly from the controller 80 instead of operating through the synchro-differential 67, synchro-transformer 50, and servo-amplifier 56. It will be understood that corresponding parts in Figure 4 are indicated by the same reference characters as in Figure 2 so as to make the figures easier to compare, even though the parts are shown in somewhat different relationship to one another for a simplified explanation of the invention. It will be understood further that amplifiers will be used wherever necessary, as well understood by those skilled in the art.

The sound film, which is the master film in the controller apparatus illustrated, is indicated by the reference character 130 in Figure 4 with the sound reproducing head 131 connected to the sound outlet 24. A short recorded or patch track signal on the film 130 is picked up by the signal impulse device 86, and is supplied through the amplifier 87 and conductors 27 to the coil 134 of the relay 135. This relay 135 has three armatures 136, 137 and 138. All of these armatures 136, 137 and 138 are held against their back contacts by a spring 140 when the coil 134 is not energized.

When the coil 134 is energized, all of the armatures 136, 137 and 138 are drawn forward against their front contacts. The armature 136 operates circuits for the control of the projector 11. The armatures 137 and 138 control circuits for the other two projectors which are to be synchronized with the operation of the sound reproducer 21. If there are more than three projectors to be synchronized with the operation of the sound film, then there will be additional armatures similar to the armatures 136, 137 and 138, with corresponding contacts in front and in back of them.

Synchronizing signals on a motion picture film 144, in the projector 11, are similar to those on the film 130 of the sound reproducer 21, and they operate the impulse device 88 to supply signals through an amplifier 89 and conductors 90 to a coil 148 of a relay 150. This relay 150 has an armature 151 which is normally spaced from a front contact, and has another armature 153 which is normally touching a back contact. When the relay coil 148 is energized, it pulls the armature 151 against the front contact, and pulls the armature 153 away from the back contact, the armatures 151 and 153 being linked together for operation in unison, but being insulated from one another because they control separate circuits.

There are four other relays in the controller 80 shown in Figure 4. These relays include a relay 161 which operates when the motion picture film 144 is running behind the film 130 of the sound reproducer; that is, when the picture film is slow. There is another relay 163 which is operated when the picture film 144 is running ahead of the sound film 130. There is a relay 165 which operates to run the servo-motor 147 forward for re-synchronizing the films; and a relay 167 which operates to run the servo-motor 47 in reverse when rotation in that direction is necessary to re-synchronize the films 130 and 144.

The synchronizing signals on the films 130 and 144 are preferably of short duration so that when the films are travelling at their normal operating speeds, the pulse of current supplied to the relays 135 and 150 is not quite as long as the time required for the relays 135 and 150 to close.

These relays 135 and 150 do close, however, because the inertia of their armatures is sufficient to carry them into closed positions and the inductance of their coils 134 and 148 can be sufficient to prolong the magnetic attraction somewhat beyond the duration of the synchronizing signal impulses from the films. The relays 161 and 163 are fast acting relays which close promptly in response to short pulses of power to their operating coils 171 and 173, respectively. The relays 165 and 167 are slow acting relays each being equipped with a short circuiting ring around the core 175 which retards the magnetization of the operating coils of these relays and precludes the quick closing of the relays. If the films 130 and 144 that are out of synchronization by less than one frame, then the time between synchronization signals from the impulse devices 86 and 88 is not sufficient to permit the relays 165 and 167 to close.

Power for operating the relays is supplied from a source indicated as a battery 179 in Figure 4. All of the relay armatures are normally held in the positions shown in this figure by spring bias such as the spring 140 of the relay 135.

If the sound film 130 is running ahead of the picture film 144, then a synchronization signal on the film 130 will operate the impulse device 86 before the corresponding synchronization signal on the film 144 operates the impuse device 88 of the projector 11. The impulse from the sound reproducer 21 energizes the coil 134 of the relay 135 and causes the armature 136 to move away from the back contact into position to touch the front contact. This completes a circuit from the battery 179 through a conductor 181 to the armature 136, through the contact in front of the armature 136, and through a conductor 183 to the operating coil 171 of the relay 161. This relay 161 is the one which is energized when the picture film is running slow; that is, behind the sound film. The other side of the operating coil 171 is supplied through conductors 185 and 186 which lead to the back contact of the relay 150, and through the armature 153 and conductors 187 and 188 to the battery 179.

When the operating coil 171 of the relay 161 is energized, it pulls both of the armatures of this relay against contacts in front of them and establishes a circuit from the forward contact of the relay through the front armature to the back armature and thence through the rearward contact of the relay to an operating coil 190 of the relay 165. If this circuit remains closed long enough for this slow acting relay 165 to operate, both of the armatures of the relay 165 are pulled forward against their contacts to close a circuit to the servo-motor 47.

There are three conductors 82 leading to the servo-motor 47. When the upper conductor is energized, the servo-motor 47 turns in a rearward direction, and when the middle conductor 82 is energized and the servo-motor 47 turns in a forward direction. The bottom or lower conductor 82 is a common supply line which is used with either of the other two conductors. The power for operating the servo-motor 47 is taken from a power line 192, in Figure 4. From the wiring diagram it will be apparent that power is supplied to the upper conductor 82 when the coil of the relay 167 is energized, and to the middle conductor 83 when the coil of the relay 165 is energized.

Since the relay 135, which is operated by a pulse of current from the sound reproducer 21, is energized for only a short time, it is necessary to have a holding circuit for the relay 161. This holding circuit can be traced from the battery 179 through a conductor 195, through a relay armature 196, conductor 199, and conductor 200 to the armatures of the relay 161, and through the forward contact of this relay to the coil 171. The circuit from the coil 171 back to the battery 179 remains the same as previously described.

Since the circuit of the operating coil 171 of the relay 161 passes through the back contact and rearward armature of the relay 150, it will be apparent that this circuit is broken whenever the relay 150 has its operating coil 148 energized by a synchronizing signal from the impulse device 88. If the synchronizing signal on the film 144 follows so close behind the synchronizing signal of the sound film 130 that the slow operating relay 165 does not have time to close, then the synchronizing mechanism will not operate. In the preferred embodiment of the invention, the time delay in the relay 165 is approximately 20 milliseconds and this corresponds to something less than the projection time of one picture frame. It is not desirable to have the synchronizing mechanism operate where the films are out of synchronism by less than one picture frame.

If the synchronizing signal comes from the film 144 before it comes from the sound film 130, then the relay 150 will close and operate the relays 163 and 167 to supply energy to the middle conductor 82 for driving the servo-motor 47 in a direction to slow down the film 144 so that the sound film 130 can catch up. The operation of the mechanism for an advanced picture film is similar to that for a retarded picture film except that different relays come into operation. The circuits will be clearly understood from the description that has already been given in connection with the operation for a retarded picture film.

A cam 205 is driven from the servo-motor 47 through a belt or other suitable motion transmitting mechanism 206. This cam 205 operates a cam follower 207 which is held in contact with the cam 205 by a spring 210. The cam follower 207 is attached to a blade of a switch 211, and this blade which moves between front and back contacts of the switch, as illustrated. When the cam 205 pushes the follower 207 outwardly, into the position shown in Figure 4, the blade of switch 211 touches the back contact; but as soon as the cam 205 rotates, the cam follower 207 moves inwardly, under the influence of the spring 210 and the blade of the switch 211 comes against the front contact of the switch. When the blade is against this front contact, there is a circuit from the battery 179, through the conductor 195, conductor 214, to the front contact and blade of switch 211, and from this switch through a capacitor 216 and conductor 218 back to the battery 179. With this circuit closed, the battery 179 charges the capacitor 216 to the potential of the battery.

When the cam 205 completes one revolution, it pushes the follower 207 rearwardly until the blade of switch 211 touches its back contact, and this puts a coil 220 across the capacitor 216 so that the capacitor discharges through the coil 220 and momentarily energizes this coil which pulls the armature of relay 196 away from its contact to break the holding circuit of the relay 161 or relay 163, depending upon which of these relays had been energized. The cam 205 makes one revolution for each correction equivalent to one picture frame of film length and thus the control relays 161 and 163 are de-energized and the synchronizing operation stops whenever the cam 205 has completed one revolution. In this way the control apparatus of Figure 4 is limited to a correction of one frame for each synchronizing error detected by difference in the arrival of synchronization signals at the impulse devices 86 and 88.

Figure 5 shows a modified form of the invention in which the control mechanism first detects that there is an error in the synchronization, and then determines the extent of the error, and operates the servo-motor for correcting the error in accordance with the extent of error determined. The initial operation of the control mechanism shown in Figure 5 entails the operation of relays by impulses from the impulse devices 86 and 88 operating in the same way as already described in Figure 4. Parts of the control mechanism of Figure 5 which correspond to those of Figure 4 are indicated by the same reference characters.

The control mechanism shown in Figure 5 also includes a film frame counter switch 230. The purpose of this counter switch is to determine the number of picture frames passing through the projector during the time interval between impulses from the impulse devices 86 and 88. This counter switch 230 operates continuously and counts the number of picture frames passing regardless of whether the picture film is fast or slow.

The counter switch 230 includes a cam 232 on a shaft 233 which is driven through gearing 234 operated by the motor 43 which drives the projector 11. The cam 232 operates a follower 236 on a switch blade 238. The cam follower 236 is held in contact with the cam 232 by a spring 240 connected to the switch blade 238. When a lobe of the cam 232 displaces the follower 236 outwardly, the switch blade 238 touches a contact 242 of the counter switch 230 and closes a circuit to a frame error totalizer which will be described.

The gear ratio between the motor 43 and the cam shaft 233 is designed to produce one operation of the counter switch 230 for each picture frame that passes through the projector. In the construction illustrated, the cam shaft 233 makes one quarter turn for each film frame that passes through the projector, and there are four lobes on the cam 232. If the cam shaft 233 is geared to make one revolution for each picture frame that passes through the projector, then the cam 232 will have only one lobe. It is merely necessary that the switch blade 238 touch the contact 242 once for each picture frame passing through the projector.

The control mechanism of Figure 5 includes a totalizer indicated generally by the reference character 250. This totalizer includes a notched wheel 252 on the same shaft with a cam 254. The cam 254 operates a follower 256 on the blade of a switch 258. This switch 258 has one contact below the blade and one contact above it.

The cam 254 is designed so that it has a short arc which holds the follower 256 in position to locate the blade of the switch 258 midway between the contacts of the switch. The cam 254 is shown in position to hold the blade of switch 258 in this mid position in Figure 5. The cam 254 has one arc which holds the follower 256 high enough to bring the blade of the switch 258 against the top contact of the switch; and has another arc at a lower level which causes the cam follower 256 to move downwardly until the blade of the switch 258 is against the bottom contact of the switch. Rotation of the cam 254 in a clockwise direction in Figure 5 raises the follower 256 and closes the switch 258 against its upper contact. Rotation of the cam 254 in a counter-clockwise direction in Figure 5 causes the switch 258 to close against its lower contact.

With the totalizer 250 connected in the circuit as shown in Figure 5, the cam 254 is turned clockwise when the synchronization error requires that the servo-motor subtract film frames, that is, show down the picture film 144; and the cam 254 turns in a counter-clockwise direction when the synchronization error is one that requires that film frames be added to the picture film 144, that is, that the film 144 be speeded up in order to catch up with the sound film 130.

The counter wheel 252 is rotated by pawls connected to the free ends of armatures 261 and 262. These armatures are normally held in elevated positions by springs 264, and they are pulled down at appropriate times by the magnetic attraction of coils 266 and 267, respectively. Energizing of the coil 266 pulls the armature 261 downwardly and operates its pawl to move the wheel 252 counter-clockwise for an angular distance equal to one notch of the wheel 258. Conversely, energizing of the coil 267 pulls the armature 262 downwardly far enough to turn the wheel 252 clockwise an angular distance equal to one notch.

The operating mechanism for the notched wheel 252 is shown only diagrammatically in Figure 5 because such pawl-operated wheels are well known in the art and the specific totalizer construction used is not important to the combination of this invention. The wheel 252 is shown with large notches and with only a few of them, for clearer illustration, but it will be understood that this wheel has as many notches around its circumference as there are film frames to be counted in the maximum error correction which the control mechanism will perform. This total of error correction includes both the number of picture frames by which the picture film may be both ahead and behind the sound film. That is, if the apparatus is to correct a synchronization error of twenty picture frames ahead of the sound film and up to twenty picture frames behind the sound film, then the number of notches on the wheel 252 must be at least 40. Some portion of the circumference of the wheel 252 must allow for the intermediate neutral position of the cam 254 so that the notches on the wheel 252 which are effective in counting synchronization errors cannot utilize the entire circumference of the notched wheel 252.

The operation of the control mechanism shown in Figure 5 will be described, but only those parts which are different from the control mechanism in Figure 4.

It will be noted in Figure 5 that each of the relays 161 and 163 has two more armatures than the corresponding relays in Figure 4. The counter switch 230 has its contact 242 connected to a conductor 280 which connects with an armature 281 of the relay 161 and a corresponding armature 282 of the relay 163. Both of these armatures 281 and 282 are normally spaced from their contacts in the relays 161 and 163.

If the relay 161 closes ahead of the relay 163 then the armature 281 is pulled against its contact in the relay 161 and circuit is established through a conductor 285 to the coil 267 of the totalizer 250. So long as this circuit remains closed, every operation of the counter switch 230 sends an impulse of current to the coil 267 of the totalizer and causes the totalizer to move the armature 262 and its associated pawl to turn the cam 254 step by step in a clock-wise direction.

If the relay 163 closes ahead of the relay 161, then the armature 282 is drawn against its contact in the relay 163 and a circuit is closed through a conductor 287 to the coil 266 of the totalizer to operate the armature 261 and its associated pawl to rotate the wheel 252 and cam 254 step by step in a counter-clockwise direction. The direction of rotation of the totalizer 250, therefore, depends upon which one of the relays 161 and 163 is operated first, and this in turn depends upon whether the sound film is ahead of the picture film or vice versa.

If the relay 161 closes first, the totalizer 250 will continue to count the picture frames in a clockwise direction until the synchronizing signal on the picture film 144 sends an impulse from the impulse device 88 to operate the relay 150 and break the holding circuit of the relay 161. This stops further counting of picture frames by the totalizer 250. If the relay 163 closes first, it will be understood that the totalizer 250 will count frames in the counter-clockwise direction until a synchronizing signal from the film 130 causes the impulse device 86 to operate the relay 135 and break the holding circuit of the relay 163.

Another difference in the control circuit of Figure 5, as compared with that of Figure 4, is that the relays 165 and 167 in Figure 5 are not slow acting relays and they are not closed by current received from the relays 161 and 163 as was the case in Figure 4.

On the contrary, the relay 165 is closed by circuit through the switch 258 when the blade of that switch is against its upper contact, and the relay 167 is closed by a circuit through the switch 258 when the blade of the switch is against its lower contact. The circuit for the relay 165 can be traced from the battery 179 through the conductor 188 to the coil 190 of the relay 165, and from the coil 190 the circuit extends down to the upper contact of switch 258 and through the blade of that switch, if the blade is in raised position, to a conductor 294 which connects with the conductor 181 leading back to the other side of the battery. A corresponding circuit for the operating coil of relay 167 can be traced from the battery 179 through the lower contact of the switch 258.

After the extent of the synchronization error has been determined by the totalizer 250, and the synchronization signal from the late running film has caused the holding circuit for the energized relay 161 or 163 to open, the control mechanism then operates to correct the synchronization error.

As soon as the totalizer 250 has turned the cam 254 far enough to lift the blade of the switch 258 against its upper contact, the circuit of the coil 190 is closed and this coil is energized to operate the relay 165. When the cam 254 turns in the other direction so that it causes the blade of switch 258 to touch its lower contact, the circuit is closed to the coil of the relay 167 to close that relay.

In order to prevent the closing of the relays 165 and 167 from supplying power to the servo-motor 47 while the totalizer is counting film frames to determine the extent of the synchronization error, there are armatures 301 and 302 in the relays 161 and 163, respectively, for preventing the relays 165 and 167 from being effective while the relays 161 and 163 are energized. After the synchronization error has been counted by the totalizer 250, and the holding circuit of the relays 161 or 163 has been opened so that both of these relays 161 and 163 are de-energized, then the armatures 301 and 302 are back against their contacts, and whichever one of the relays 165 and 167 is energized becomes effective to transmit power to the servomotor 47.

For the remainder of the re-synchronizing cycle the totalizer 250 is operated by the cam 205 actuating the switch blade 211. As each picture frame is added to or subtracted from the position of the picture film 144, the cam 205 makes one revolution and moves the switch blade 211 back and forth between the contacts above and below it.

When the switch blade 211 touches its upper contact, the circuit is closed connecting the capacitor 216 across the battery 179, and the capacitor is charged. Whenever the cam 205 moves the switch blade 211 into position to touch the lower contact, the circuit is closed from the capacitor 216 to one or the other of the coils 266 and 267 of the totalizer 250, depending upon which way the totalizer was turned when counting the synchronization error. If the totalizer 250 was operated by the coil 267 to rotate the notched wheel 252 and the cam 254 in the clockwise direction, then in this synchronization correction portion of the cycle, the coil 266 will be operated by impulses from the capacitor 216 to turn the notched wheel 252 back in the opposite direction until the cam 254 reaches its original position. At this time the total number of frames counted by the totalizer as a synchronization error, will have been corrected by operation of the servomotor 47.

Taking a case where the totalizer 250 has been turned three film frames in a clockwise direction by operation of the coil 267, the circuit from the capacitor 216 can be traced to the conductor 188 and from this conductor through another conductor 305 which connects with both of the coils 266 and 267 of the totalizer. Since the switch 258 is closed against its upper contact, and relay 165 is energized, while the relay 167 is not, there will be no closed circuit beyond the coil 267 but there is a closed circuit beyond the coil 266.

This circuit from the coil 266 can traced through a conductor 307 to the third armature of the relay 161 and through this third armature 309 to an armature 311 which is held against its contact by the energized coil 190 of relay 165, and then from the armature 311 back through a conductor 292 to the lower contact under the switch blade 211 and through this switch blade 211 to the capacitor 216.

The charging and discharging circuits of the capacitor 216 are closed once for every revolution of the cam 205, which is once for each picture frame added to or subtracted from the position of the film 144 with respect to the sound film 130. Between each closing of the circuit by which the capacitor 216 operates the totalizer 250, the capacitor 216 is recharged from the power supply 179 by contact of the switch blade 211 with the contact above it. As soon as the totalizer 250 has counted back all of the frames which it counted forward during the measuring of the synchronization error, the cam 250 will have returned to its original position and the blade of switch 258 will move into its intermediate position away from both its contacts and the circuit of the coil 190 will be opened causing the relay 165 to return to its de-energized position. This shuts off the power to the servo-motor 47 and stops the synchronization correction which is now complete.

Figure 6 shows another modified form of the invention in which the extent of the synchronization error is measured by the sequential actuation of memory relays which are then released in the reverse order to determine the amount of correction that has been made by the servomotor in adding or subtracting picture frames to or from, the position of the motion picture film with respect to the sound film. Parts corresponding to those of Figures 4 and 5 are indicated by the same reference characters and the relays 161, 163, 165 and 167 are indicated by the same reference characters as in Figures 4 and 5; and although these relays are not connected in the same way as in the previous figures, they perform corresponding functions in the circuit.

The relays 135 and 150 are operated whenever their coils 134 and 148 are energized by amplified impulses from the impulse devices 86 and 88 on the sound reproducer and motion picture projector, respectively. This is the same as in Figures 4 and 5.

Current from the battery 179 is supplied through a conductor 181 and through another conductor 315 to the armature 136 of the relay 135. When relay 135 is energized, the armature 136 is against the front contact and a circuit from the armature is completed through a conductor 317 to the coil 171 of the relay 161, and the coil 171 is further connected to conductors 319 and 320 leading back to the battery 179.

The armature 151 of the relay 150 is similarly connected with the battery 197 and a conductor 181 by means of conductor 322. When relay 150 is energized the armature 151 is pulled against its front contact, to supply power to the operating coil 173 of the relay 163, as this coil 173 is further connected to the conductors 319 and 320 leading back to the battery 179.

When the relay 161 is actuated, its forward armature is pulled against its front contact to establish a holding circuit for the relay 161 and this holding circuit can be traced through the forward armature of the relay 161 and through a conductor 325 to the back contact of the second armature of the relay 163. If the relay 163 is not energized, the holding circuit continues through the second armature of this relay 163, in its closed circuit position, to another conductor 327 leading to the back contact of the relay 150. If the relay 150 is not energized, then the holding circuit continues through the armature 151 back to the power supply line 181 which connects with the battery 179.

This holding circuit will therefore remain closed from the time the synchronizing signal from the impulse device 86 actuates the relay 135 until the time that the synchronizing signal from the impulse device 88 energizes the relay 150 and breaks the holding circuit of relay 151 by pulling the armature 151 away from the back contact of the relay 150. This construction for maintaining the relay 161 energized during the time between synchronization signals on the sound film and the motion picture film is similar to that in the control mechanism shown in Figures 4 and 5. Similarly the relay 163 will remain energized, if it is energized first, for the length of time between the actuation of relay 150 by a synchronization signal from the picture projector impulse device 88 and the actuation of relay 135 by the subsequent transmission of a corresponding synchronization signal from the impulse device 86 of the sound reproducer.

The relay 161 has a third armature 328 which when this relay is actuated, is pulled against a contact to establish a circuit from the conductor 325 through a conductor 330 to a contact 332 of the relay 165. An armature 334 of relay 165, normally touches the contact 332 whenever the relay 165 is deenergized and this completes a circuit from the contact 332 through the coil 190 and back through a conductor 336 to the common return line 320 to the battery 179. Thus when relay 161 is actuated this circuit energizes the coil 190 and causes the armature 311 and the rearward armature 338 of the relay 165 to be pulled forward against the contacts in front of them. The forward movement of the armature 311 pushes the contact 334 away from the contact 332 and breaks the circuit from the contact 328 of relay 161 but in turn causes a new holding circuit to be established through the armature 311 and conductor 340 for the receipt of current from the battery 179 through parallel holding circuit contacts of a group of memory storage relays 341, 342, 343 and 344. There are as many memory relays 341—344 as the maximum number of picture frames that the control apparatus is to correct at one time. If the maximum synchronization error, in either direction, that is, fast or slow, is twelve picture frames, then there will be twelve memory relays 341—344. As long as any one of the memory relays is energized, there will be a holding circuit from the power line 320 to the conductor 340 which supplies holding current for the coil 190 of relay 165.

The third armature 338, of the relay 165, establishes a circuit for the servo-motor 47 as in the case of the control circuits shown in Figures 4 and 5. In order to prevent the servo-motor 47 for receiving power before the control mechanism has counted the extent of the synchronization error, the circuit through the armature 338 leads through a rearward armature 301 of the relay 161, as in the case of the control circuit shown in Figure 5. Thus the power supplied through the conductor 378 to the servo-motor 47 is not complete until the synchronization error has been determined and the relay 161 has returned to its original deenergized position.

The relay 167 operates in a manner similar to the relay 165 but has connections for operating the servomotor 47 in the opposite direction since one of these relays is for correcting a plus synchronization error and the other for correcting a minus synchronization error.

The relays 165 and 167 are of the slow operating type so that neither of these relays will close unless the synchronization error is at least one picture frame. The purpose of this has already been explained in connection with the control circuit of Figure 4.

The synchronization error is counted by the switch 230 operated by the cam 232. Each time that a film frame passes through the motion picture projector, one of the lobes on the cam 232 displaces the switch blade 238 and brings it into position to touch the contact 242 below it. This closes a circuit from the battery 179, through the conductor 181, switch blade 238, switch contact 242 and through a conductor 350 to armatures 353 and 354 of the relays 161 and 163 respectively. If either of the relays 161 or 163 is energized, its armature 353 or 354 will be pulled against the contact in front of it and a circuit will be closed through a conductor 356 to a contact 358 of the first memory relay 341.

If the memory relay 341 is not energized, then its switch blade 360 touches the contact 358 and establishes a circuit to the battery 179 through the operating coil 362 of this first memory relay 341. All of the memory relays have induced current loading rings 365 which makes them slow opening relays, or slow release after the discontinuance of their actuating current.

All of the memory relays 341 have three armatures 371, 372 and 373, although there are some differences in the circuits connected to these armatures in the first and last relays in the memory chain. Energizing of the coil 362 causes the armatures 371, 372 and 373 to be pulled up against contacts in front of them. The contact in front of the armature 371 is attached to the switch blade 360 and when the armature 371 is attracted by the operating coil 362, it displaces the switch blade 360 away from the contact 358 thus replacing the circuit which originally energized the coil 363 by a holding circuit for the coil 363 through the switch blade 360, the armature 371 and the next memory relay 342 and each subsequent memory relay finds its holding circuit through the next relay whether the next relay is energized or not, as will be readily understood from an inspection of the relays 342, 343 and 344.

For the first relay in the memory chain, relay 341, the armature 372 performs no function since its normal function is to provide the holding circuit for the relay in front of it and there are no relays before the relay 341. This first relay has an armature marked 372 so that all of the memory relays might be of the same construction for the standardized manufacture.

The third armature 373 of each of the memory relays establishes a power circuit for holding either the relays 165 or 167 closed, after they have been actuated by operation of the relay 161 or 163, as has been described.

The relay 342 is similar to the relay 341 and its armatures and contacts are indicated by the same reference characters. However, the contact 358 which controls the initial energizing of the relay 342 receives its power through a contact 368 of relay 341 which is energized only when the armature 371 has been pulled forward by the coil 362 of that relay. Thus for each of the memory relays the movement of the armature 371 displaces the switch blade 360 and permits the contact 358, and the arm 369 which carries it, to be pressed forward by a compression 374 into position to touch the contact 368. This movement is less than the total movement of the armature 371 so that the switch blade 360 moves further than the arm 369 and is disconnected from the contact 358, even though the contact 358 may move to some extent toward the operating coil 362.

From this description it will be apparent that each time the frame counting cam 232 brings the switch blade 238 against the contact 242, a current impulse will be supplied for operating in sequence one of the memory relays 341 through 344; and the operation of each memory relay sets up a circuit that the next memory relay might receive an impulse for energizing its operating coil the next time that the cam 232 provides a power impulse to the memory relay chain.

When the second synchronization signal arrives at the signal impulse device 86 or 88, the holding circuit of the relay 161 or 163, depending on which of these relays is closed, will be broken. For example, if the synchronization signal on the sound film arrives at the signal impulse device 86 before the synchronization signal on the picture film arrives at the signal impulse device 88, then the relay 161 will have been closed by the synchronization signal on the sound film and the holding circuit for this relay 161 will remain closed as long as the armature 151 of the relay 150 remains against the back contact. However, when the synchronization signal on the picture film reaches the signal impulse device 88, the actuation of relay 150 will move the armature 151 away from the back contact and the holding circuit of the relay 161 will be opened.

Conversely, if the synchronization signal on the picture film arrived at the signal impulse device 88 before the corresponding synchronization signal on the sound film arrived at the signal impulse device 86, then the relay 163 will be closed and will remain closed as long as the armature 136 is against the back contact of relay 135. However, when the synchronization signal on the sound film reaches the signal impulse device 86, the relay 135 will actuate and move the armature 136 away from the back contact to break the holding circuit for the relay 163.

If the relay 161 is the one which was energized by the arrival of the synchronization signal of the sound track ahead of the corresponding signal of the picture film, then the relay 165 will have been closed as described before; but relay 165 remains closed after the relay 161 is de-energized because of the holding circuit which extends from the contactor 334, through the armature 311, conductor 340, and any of the armatures 373 of the memory relays 341—344 and to the conductor 181 leading to the battery 179.

De-energizing of the relay 161 permits all of the armatures of that relay to move back into the positions shown in Figure 6 and this brings the last armature 301 against the contact behind it. Since the relay 165 remains energized, a circuit is established from one side of the power line 192 through a conductor 375, armature 338 of the relay 165, conductor 377, armature 301 of relay 161, and conductor 378 to the servo motor 47. The return conductor 380 from the servo motor is connected with the other side of the power line 192. With this circuit closed the servomotor 47 operates in a direction to correct the synchronization error by driving the differential 45 in the same manner as in the control devices shown in Figures 4 and 5.

While the relay 165 will remain closed as long as the memory any one of the relays 341—344 remain closed, the momentary actuation of the counting out switch 385, in a manner which will next be described, breaks the holding circuit and, after the previously energized relay 161 or 163 is de-energized, will cause the memory relays 344 back through 341 to be released one after another in the opposite sequence to which they were energized. For example, if all of the memory relays had been actuated, the memory relay 344 will be de-energized first and this conditions the memory relay 343 ready to be de-energized upon the next actuation of the counting out switch 385 by causing the original holding circuit of the relay 343 to be interrupted at armature 372 of relay and to be connected directly through the counting out relay switch 385. The relays 341—344 are made as slow release relays so as to prevent more than one of these relays from being released for each actuation of the counting out switch 385.

The counting out switch is operated by a coil 387 which draws the blade of the switch 385 away from its contact, to open the switch, each time that the previously described discharging of capacitor 216 momentarily energizes the coil 387. The switch 385 is normally held closed by spring bias. Successive pulses of current to energize the coil 387 are supplied from the charged capacitor 216 each time that the armature of the switch 211 is moved into position to touch the rearward contact of this switch by the cam 205.

As the cam 205 rotates, and the high part of the cam moves away from the follower 207, the spring 240 moves the blade of the switch 211 against the front contact of the switch and this closes a circuit which connects the capacitor 216 across the battery 179 to charge the capacitor, as was described in connection with Figure 4.

It will be understood that there are as many memory relays 341—344 as there are film frames to be counted at one time by the totalizer comprising the memory relays 341—344. If the control mechanism is to be capable of counting synchronization errors as great as fifteen film frames, then there must be fifteen memory relays 341—344.

After the operation of the counting out switch 385 has continued to release one memory relay after another until the first relay 341 is finally de-energized, then the movement of the armature 373 away from its contact breaks the holding circuit of the relay 165, or 167, depending upon which of these relays is controlling the operation of the servomotor 47, and the power supply circuit to the servomotor is disconnected. The films are again in synchronization since the release of the relay 341 indicates that enough film frames have been added to, or subtracted from, the position of the picture film with respect to the sound film to correct the synchronization error totalized during this sequence. It will be obvious that if the synchronization error is at any time greater than the total number of memory relays, the remaining, or unresynchronized frames will be picked up in subsequent resynchronization cycles.

Figure 7 is a view of a motion picture film having a narrow track 390 along one edge and having a synchronization signal 392 extending for a limited distance at one location along the track. Other synchronization signals are located at other places along the track, but the signals must not be closer than the maximum synchronization error which the mechanism is designed to correct, as previously explained. The track 390 may be a magnetic recording-reproducing track and the signal 392 may be magnetically recorded on the track for cooperation with the proper type of signal impulse device on the motion picture projector. The signal 392 may also be made upon this magnetic track by means of the magnetic film marker disclosed in my co-pending application, Serial No. 343,176; now Patent No. 2,718,849 issued September 27, 1955.

Figure 8 is a greatly enlarged fragmentary view showing a synchronization signal attached to the film 144 by adhesive 395. This synchronization signal 394 is a patch signal connected to the film at the proper location and the particular construction shown includes a thin piece of plastic 397 with a coating 398 of permanently magnetic material. This synchronization signal cannot be erased and if it becomes necessary to eliminate it, it is removed from the film by softening the adhesive 395.

Various other kinds of synchronization signals can be used including those which are mechanically operated by notches, holes, or protruberances on the film, and particular kind of synchronization signal used has no effect upon the automatic synchronizing apparatus of this invention so long as the signal impulse devices of the film operating units are appropriate for operation by the particular synchronization signals on the film. It is merely necessary that the synchronization signal on the film produce a current impulse for the relays which start the operation of the automatic control mechanism.

The invention has been described with a synchronization error detector and with error correcting mechanism that corrects one frame at a time. It has also been described with error computing means for determining the extent of the error so that the entire error can be corrected after each set of synchronization signals. Other modifications and changes can be made in the constructions illustrated, and some features of the invention can be used in different combinations without departing from the invention as defined in the claims.

What is claimed is:

1. Automatic apparatus for synchronizing films, at least one of which is a motion picture film, said apparatus comprising separate operating mechanism for advancing each of the films, each of the separate mechanisms including a motor, signal impulse devices operated by synchronizing signals on the respective films, a synchronization error detector to which synchronization signals are supplied by both of said devices, the detector including control means responsive to differences in the timing of the synchronization signals at said detector resulting from the arrival of the synchronization signal of one film at its signal impulse device ahead of the corresponding signal of the other film, and error correcting mechanism controlled by the control means of the error detector, the error correcting mechanism including means that change the longitudinal positions of the films with respect to one another, and the correcting mechanism having a control that makes the changes occur in steps of one image frame.

2. The automatic apparatus for synchronizing films described in claim 1 and in which the means for shifting the picture film in steps of one image frame operates selectively in opposing directions for advancing or retarding the picture film with respect to the other film, and means responsive to which film signal comes first for determining the direction of operation of the means for shifting the picture film.

3. Automatic apparatus for synchronizing films, at least one of which is a motion picture film, as they advance through different film-operating units, said apparatus including a signal impulse device responsive to synchronization signals on one film and a second signal impulse device responsive to synchronization signals on the other film, and a synchronization error detector to which synchronization signals are supplied by both of said devices, the detector including control means responsive to differences in the timing of the synchronization signals at said detector resulting from arrival of the synchronization signal at one impulse device ahead of the arrival of the corresponding synchronization signal at the other impulse device, and error correcting mechanism controlled from the control means of the error detector, said error correcting mechanism including a differential through which the picture film is driven and step-by-step means for operating the differential through predetermined angles in opposite directions to either advance or retard the picture film with respect to the other film in steps of one image frame.

4. The automatic apparatus described in claim 3 and in which the error correcting mechanism is associated with the driving means for only the picture film and the differential is a mechanical differential which has the ring gear driven in opposite directions by a servomotor for advancing or retarding of the picture film.

5. The automatic apparatus described in claim 3 and in which the error correcting mechanism includes connections for restoring the error detector to an original neutral position each time the film is advanced or retarded by the error correcting mechanism.

6. Apparatus for synchronizing films in separate film operating units and in which at least one of the films is a motion picture film having successive image areas along its length and synchronization signals on both films at spacing at least as great as the combined length of a plurality of image areas, said apparatus including a separate signal impulse device on each unit responsive to synchronization signals on the film operated by that unit, a synchronization error detector to which synchronization signals are supplied by both of said devices, the detector including control means responsive to differences in the timing of the synchronization signals at said detector resulting from arrival of signals from the different devices at the detector at different times, and a counter that determines the number of image areas passing through the motion picture film operating unit between the time of the arrival of corresponding signals from the different devices at said error detector, and error correcting mechanism operated automatically in responsive to the error determined by the counter.

7. The apparatus for synchronizing films described in claim 6 and in which the error detector includes a film frame counter, control means responsive to the arrival of a synchronization signal at the signal impulse device of one film operating unit to start the film frame counter, other control means responsive to the arrival of the corresponding synchronization signal at the signal impulse device of the other film operating unit to stop the film frame counter, and in which the error computer is operated from the motor that drives the film operating unit through which one of the films is passing.

8. The apparatus for synchronizing films described in claim 6 and in which one of the film operating units is a picture projector and the error detector comprises a totalizer that counts the number of film frames passing through the projector between the time of arrival of the corresponding synchronization signals of the different films at the signal impulse devices of the respective film operating units, and in which the error detector includes means responsive to the signal impulse device of the late film for returning the error detector to an original neutral position preparatory to subsequent operation by another synchronization signal.

9. The apparatus for synchronizing film described in claim 6 and in which one of the film operating units is a projector and the error detector is a totalizer for counting the number of film frames passing through the projector between the time of arrival of the corresponding synchronizing signals at the impulse devices of the film operating units, and in which the apparatus for synchronizing films includes also means for preventing operation of the error connecting mechanism before the error computer has determined the full extent of the synchronization error.

10. Apparatus for synchronizing the operation of motion picture film with a sound film driven by a different film operating unit from the motion picture film, said apparatus including a signal impulse device on the operating unit of the motion picture film, a separate signal impulse device on the operating unit for the soud film, a synchronization error detector operated by the arrival of a synchronization signal at one impulse device ahead of a corresponding synchronization signal at the other impulse device, the error detector including means responsive to which signal arrives first for determining whether the motion picture film must be advanced or retarded to bring it into synchronization with the sound film, and error correcting mechanism connected with the picture film operating unit and including step-by-step means operable to shift the picture film in steps of one film frame, and including also reversible driving means that operate the step-by-step means in one direction or the other depending upon which signal arrived first at the error detector.

11. Apparatus for synchronizing a motion picture film, that moves with intermittent movement, with the operation of a continuously moving sound film, said apparatus including a signal impulse device responsive to synchronization signals on the motion picture film, a second signal impulse device responsive to synchronization signals on the sound film and a synchronization error detector operated by the arrival of one film signal at its impulse device ahead of the arrival of the corresponding synchronization signal of the other film at its impulse device, the error detector including means responsive to which film signal comes first for determining whether the picture frames must be added to or subtracted from the movement of the motion picture film to obtain synchronization with the sound film, a synchronization error computer comprising a totalizer that counts the number of film frames passing during the interval between the operation of the impulse devices by the signals on the different films, and an error correcting mechanism including step-by-step means operable to shift the picture film in steps of one film frame, the step-by-step means being controlled from the totalizer of the error computer, means cancelling one count of the totalizer for each film frame shift by said step-by-step means, the error correcting mechanism also including a differential in the operating mechanism that advances the motion picture film and means for operating the differential in opposite directions to shift the motion picture film with respect to the sound film.

12. In apparatus for projecting a mosaic picture from separate projectors operating with separate films, the combination including a film operating unit for a sound film which is to serve as a master film for synchronizing the operation of the projectors with the sound film and with each other, a signal impulse device on the sound film operating unit responsive to synchronization signals on the sound film, other signal impulse devices on the respective picture projectors responsive to synchronization signals on the motion picture films, a synchronization error detector for each picture projector, each error detector being responsive to the signal impulse device of its projector and to the signal impulse device of the sound film operating unit and being operated by the arrival of the synchronization signal on the film of the projector at its signal impulse device ahead of or behind the arrival of the corresponding synchronization signal on the sound film at the signal impulse device of the operating unit for the sound film, separate synchronization error correcting mechanism connected with each of the motion picture projectors and automatic control means for the error correcting mechanism responsive to the operation of the error detector of the same projector.

13. Apparatus for synchronizing films including a signal impulse device for each film responsive to synchronization signals on that film, a synchronization error detector operated by the different time of arrival of corresponding synchronization signals at the signal impulse devices for the respective films, the error detector including a film frame counter that counts the number of film frames passing during the interval between the arrival of the corresponding synchronization signals at their respective impulse devices, the film frame counter including a notched wheel and an operating pall with magnetically actuated means for moving the pall to turn the wheel one notch for each actuation of the pall, and error correcting mechanism controlled from the counter and including means for rotating the notched wheel in the opposite direction from that in which it is turned by the counter, and automatic means for stopping the operation of the error correcting mechanism when the notched wheel reaches its original neutral position from which it was displaced by the film frame counter operation.

14. Apparatus for synchronizing films including a signal impulse device for each film responsive to synchronization signals on that film, a synchronization error detector operated by the different time of arrival of corresponding synchronization signals at the signal impulse devices for the respective films, the error detector including a film frame counter that counts the number of film frames passing during the interval between the arrival of the corresponding synchronization signals of the different films at their signal impulse devices, the film frame counter comprising a group of sequentially connected memory relays, means operated by the apparatus that drives the film for successively closing the memory relays under control of the error detector, and error correcting mechanism controlled from the film frame counter and including means for successively opening the memory relays in the reverse order of their closing, the error correcting mechanism having an automatic stop responsive to the opening of the first of the memory relays.

15. Apparatus for synchronizing the operation of films of different film operating units, said apparatus comprising a signal impulse device responsive to synchronization signals on the film of one unit, a corresponding signal impulse device responsive to synchronization signals on the film of the other unit, a synchronization error detector to which synchronization signals are supplied by both of said devices, the detector including control means responsive to differences in the timing of the synchronization signals at said detector resulting from the operation of one signal impulse device ahead of the other, and step-by-step automatic mechanism that changes the position of one film with respect to the other by a predetermined length of film for each operation of the error detector.

16. The apparatus described in claim 15 and in which the error detector is responsive to the operation of either signal impulse device ahead of the other and in which the error correcting mechanism operates in either a forward or reverse direction in accordance with which signal impulse device operates ahead of the other.

17. The apparatus described in claim 15 and in which one of the films is a motion picture film operated intermittently by film feed mechanism in a projector, and in which the error correcting mechanism changes the position of the motion picture film by one image frame for each operation of the error detector, and the apparatus includes means for preventing the operation of the error correcting mechanism when the synchronization error is less than a full image frame.

18. Apparatus for synchronizing the films in several different motion picture projectors with the operation of a sound film in a film operating unit separate from the projectors, the apparatus including signal impulse devices on the projectors and on the film operating unit for the sound film, a synchronization error detector on each of the projectors responsive to the arrival of a synchronization signal on the film of each projector ahead of or behind the arrival of a corresponding synchronization signal on the sounnd film at the signal impulse device of the sound film operating unit, and separate synchronization error correcting mechanism for each projector automatically controlled by the error detector of that projector and including means for shifting the picture film in steps of one image frame.

19. The apparatus described in claim 18 and in which the motion picture films are moved with intermittent movement, one image frame at a time, and the apparatus ncludes an image frame counter for each projector with means for counting the number of image frames passing through the projector during the interval between the arrival of the synchronization signal of the film of that projector at its signal impulse device as compared with the arrival of the corresponding synchronization signal with the signal impulse device of the sound film operating unit, and the error correcting mechanism includes means for continuing the operation of said mechanism for a period dependent upon the extent of the synchronization error measured by the film frame counter.

References Cited in the file of this patent

UNITED STATES PATENTS

| | | |
|---|---|---|
| 1,718,387 | Simons | June 25, 1929 |
| 1,932,600 | Porter | Oct. 31, 1933 |
| 1,969,465 | Jones | Aug. 7, 1934 |
| 2,022,902 | Thomas | Dec. 3, 1935 |
| 2,280,206 | Waller et al. | Apr. 21, 1942 |
| 2,679,187 | Bitting | May 25, 1954 |
| 2,693,127 | Ortman | Nov. 2, 1954 |